Jan. 23, 1934.   S. B. WINN   1,944,774
SEMITRAILER
Filed July 27, 1932   2 Sheets-Sheet 1
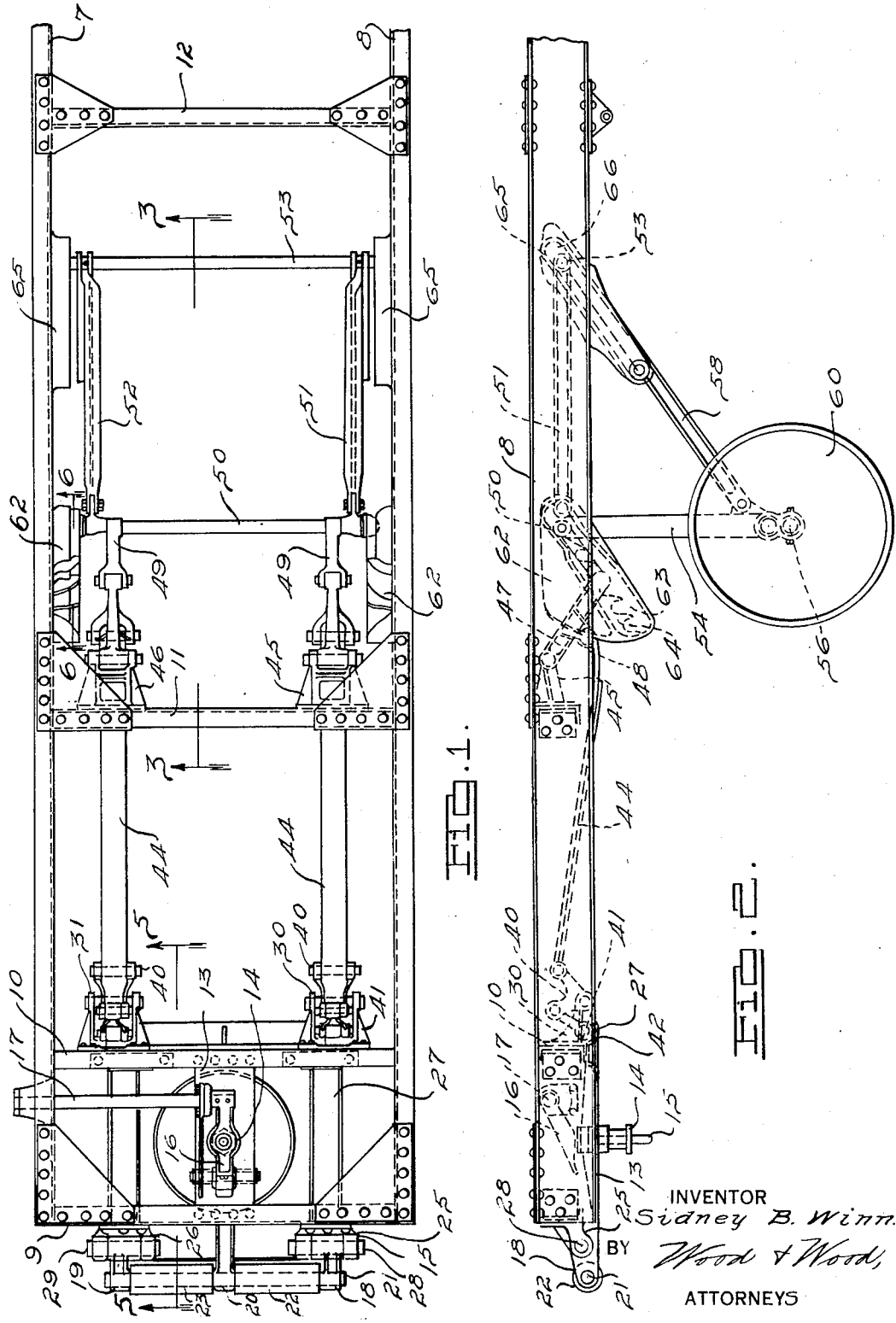
INVENTOR
Sidney B. Winn.
BY Wood & Wood,
ATTORNEYS Jan. 23, 1934.     S. B. WINN     1,944,774
SEMITRAILER
Filed July 27, 1932     2 Sheets-Sheet 2

INVENTOR
Sidney B. Winn.
BY Wood & Wood,
ATTORNEYS

Patented Jan. 23, 1934

1,944,774

UNITED STATES PATENT OFFICE 1,944,774

SEMITRAILER

Sidney B. Winn, Lapeer, Mich.

Application July 27, 1932. Serial No. 625,013

9 Claims. (Cl. 280—33.1)

My invention relates to semi-trailers and particularly to improvements in the forward support and means for elevating the forward support.

In vehicles of the semi-trailer class the forward support functions to hold the forward end of the trailer when it is uncoupled from the tractor. When it is coupled to the tractor, the forward support is raised and held above a point of contact with the road surface. In the general operation of such vehicles it is desirable that the raising and lowering of the forward support should be automatic and that the movements resulting in the raising or lowering of this support should be initiated automatically by the coupling or uncoupling of the tractor and trailer.

The coupling of the tractor and the trailer vehicles is usually accomplished by the use of a divisible fifth wheel coupling member, one part of which is referred to as the upper fifth wheel and is carried by the trailer, and the other part of which is referred to as the lower fifth wheel and is carried by the tractor. In one conventional type of such fifth wheel coupling the king pin is carried by the upper fifth wheel and depends downwardly therefrom for engagement by the coupler carried in the lower fifth wheel.

In using a fifth wheel coupling of this type it heretofore has been found difficult to provide a means for elevating the forward trailer support automatically at the time of the coupling of the vehicles, and to release the support so that it will occupy the supporting position at the time of uncoupling the vehicles. Likewise it has been found desirable that such a support should be a rigid unitary structure which is capable of supporting the trailer whether in the raised position or in the lowered position and at various points between the raised and lowered positions. The difficulty in using a support of this type with the depending king pin type of fifth wheel has been in the amount of movement necessary to provide for the raising of the support.

It is, therefore, an object of my present invention to provide a semi-trailer having a forward support which is elevated by means associated with the upper fifth wheel, said means being operated automatically during the coupling of the tractor and trailer vehicles.

It is a further object of my present invention to provide a rigid support which is raised and lowered as a rigid unit and which is in full supporting position when in the raised position and at intermediate points between the fully raised and the fully lowered positions.

These, and various other objects, features of arrangement, construction and operation, are plainly shown and described and will be best understood by reference to the accompanying drawings wherein I have shown a preferred embodiment of my invention, in which:

Fig. 1 is a fragmentary top plan view of the forward portion of a semi-trailer frame embodying my invention;

Fig. 2 is a fragmentary side elevation of the semi-trailer frame shown in Fig. 1;

Similar reference numerals refer to similar parts throughout the several views.

Figure 3:
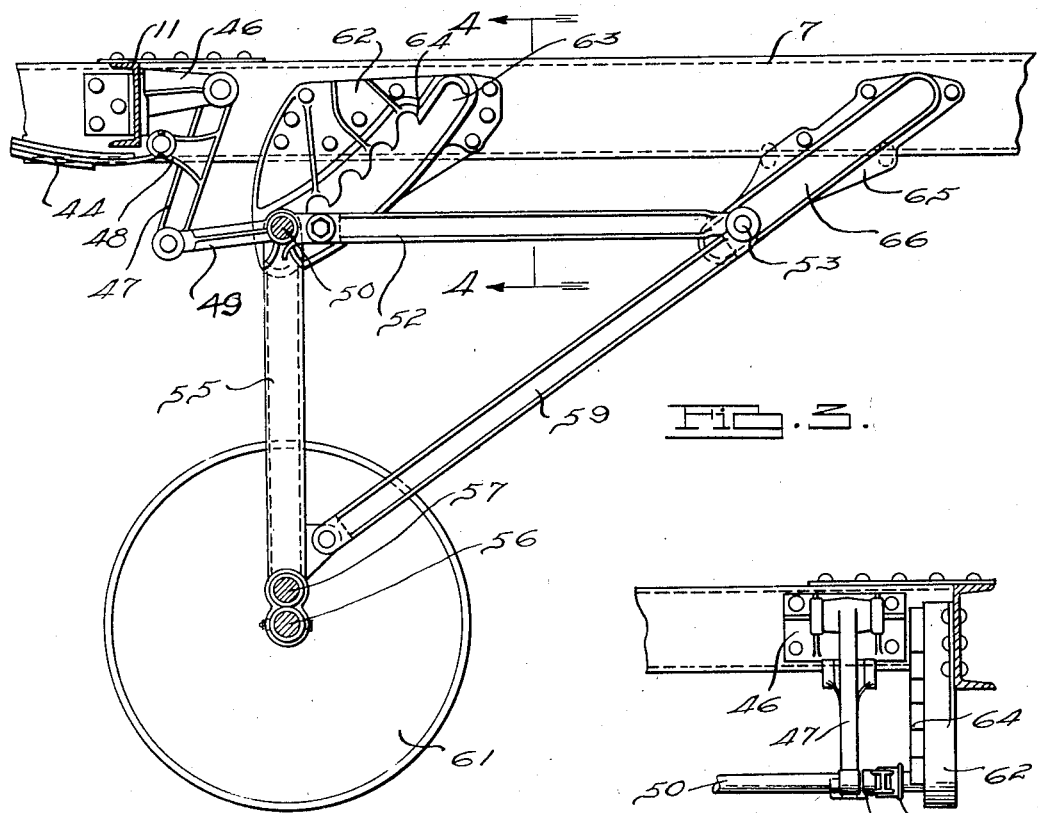
Fig. 3 is a sectional view taken on the line 3—3 of Fig. 1.
Figure 4:
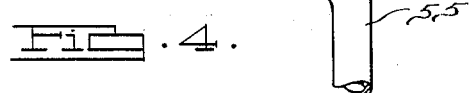
Fig. 4 is a sectional view taken on the line 4—4 of Fig. 3.

A semi-trailer of the type here shown is constructed with a frame including parallel side sills 7 and 8, and cross sills 9, 10, 11 and 12 which are secured to the side sills 7 and 8. While it is not shown in the drawings, it is to be understood that the rear end of such a trailer is supported by an axle and wheels secured to the axles, the axle and wheels being of any of the desired conventional types.

At the forward end of the frame, between the cross sills 9 and 10, the upper fifth wheel mechanism is rigidly secured. In the mechanism here shown, this includes a fixed plate 13 rigidly attached to the cross sills 9 and 10. The fixed plate 13 carries a depending king pin 14, through which extends the trailer brake operating pin 15. Adjacent the upper end of the brake operating pin 15, a brake operating finger 16 is pivotally mounted on a cross shaft 17. Operatively connected with the cross shaft 17 is the trailer brake operating linkage, which is not shown in the drawings and which is not important in connection with my present invention.

Figure 5:
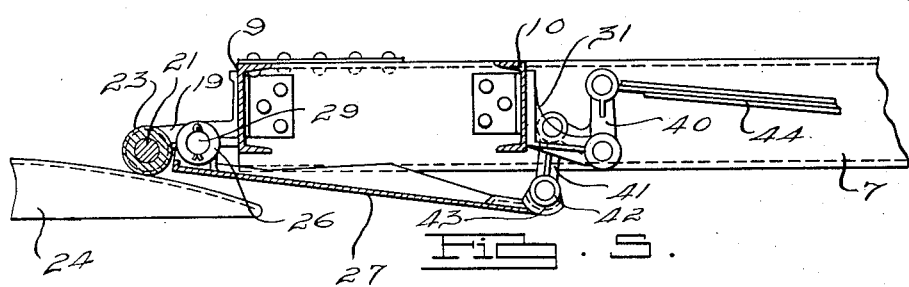
Fig. 5 is a detail fragmentary sectional view taken on line 5—5 of Figure 1, illustrating a portion of the fifth wheel coupling mechanism with the parts shown in the positions occupied when the support is in the lowered position.
Figure 6:
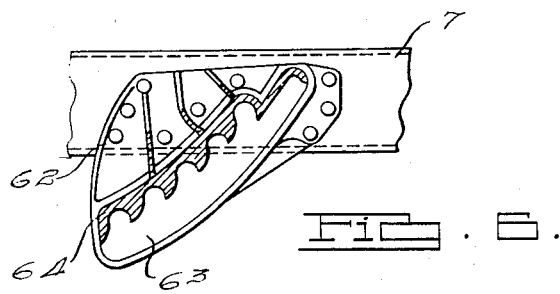
Fig. 6 is a longitudinal sectional view of a forward guide and support bracket.

Extending forwardly from the front cross sill 9 of the trailer frame are brackets 18, 19 and 20, carrying a cross rod 21, on which is carried rollers 22 and 23. The use of the rollers 22 and 23 facilitates the coupling and uncoupling of the vehicles. As shown in Fig. 5, the rollers ride up or down the inclined member 24, forming a part of the lower fifth wheel carried by the tractor.

Also secured forwardly of the cross frame 9 and at points adjacent the brackets 18 and 19, are brackets 25 and 26. A plate 27 (best shown in Fig. 5) is pivotally secured to the brackets 25 and 26 by rods 28 and 29 extending through a portion of the said plate and journaled in said brackets 25 and 26.

Brackets 30 and 31 are secured to the cross frame 10 and extend rearwardly therefrom. Pivotally mounted on each of the brackets 30 and 31 are bell cranks 40, to one arm of each of which is secured a lever 41 carrying a roller member 42 contacting with a recessed portion 43 of the plate 27 (Fig. 5). To the other arm of each of the bell cranks 40, a leaf spring arm 44 is operatively connected and extends rearwardly therefrom to a point beneath and to the rear of the cross sill 11.

Secured to the cross sill 11 and extending rearwardly therefrom at points adjacent the leaf spring arms 44, are brackets 45 and 46. Arms 47 are pivotally mounted in each of the brackets 45 and 46, each of the arms 47 being provided with a portion 48 to which the leaf spring arms 44 are pivotally secured. Each of the arms 47, at the ends opposite the brackets 45 and 46, is pivotally secured to arms 49 mounted on a cross axle 50.

Secured to the cross axle 50 are laterally extending members 51 and 52 terminating in end portions secured to a second axle 53. Also secured to the cross axle 50 are vertical supporting members 54 and 55, at the lower ends of which an axle 56 is secured. To provide for additional strength, a cross axle 57 is secured to the vertical members 54 and 55 and acts to brace the members. The vertical member 54 is connected with the axle 53 by a rearwardly extending arm 58, and the vertical extending member 55 is connected with the axle 53 by a rearwardly extending arm 59. Supporting wheels 60 and 61 are journaled on the axle 56.

Secured to the side sills 7 and 9 are brackets 62, having a track portion 63 and a plurality of notches 64 adjacent the said track portion. The axle 50 extends at each end into the track 63 in these brackets 62. Brackets 65 are secured to the side frames 7 and 8 and each is provided with a track portion 66 in which the ends of the cross axle 53 are held.

The operation of a device embodying my invention is as follows:

When the tractor and trailer vehicles are coupled, the forward trailer support is lowered and the axles 50 and 53 slide down in the respective brackets 62 and 65 and occupy the position as shown in Fig. 3. At this time the wheels 60 and 61 touch the ground or other support, and the weight of the trailer and its load bearing downward on the axle 56 and the wheels 60 and 61, causes the axle 50 to be held in one of the notches 64. At this time the plate 27 is pivoted about the point 29 and occupies the position as shown in Fig. 5.

The bell crank 40 is pivoted about the point of pivotal connection with the brackets 30 and 31, and the arm 41 and the roller 42 occupy the position shown in Fig. 5.

As will be observed, the holding of the axle 50 in the notches 64 in the brackets 62, and the action of the frame work formed with the members 51 and 52, the axle 53, the vertical members 54 and 55, the axle 50, and the bracing arms 58 and 59, form a triangular support, the lower point of the triangle carrying the axle 56 and the supporting wheels 60 and 61. All parts of the supporting mechanism remain in the same relative positions whether raised or lowered, and it will be observed that the support is always in the position for supporting the trailer whether it is in the completely raised or the completely lowered position or at points intermediate of the raised and lowered positions.

When the support is in the lowered position and the plate 27 occupies the position shown in Fig. 5 and the tractor is backed under the forward end of the trailer, the inclined portion 24 of the lower fifth wheel carried by the tractor is backed under the forward end of the trailer, the rollers 22 and 23 roll up the incline 24, and the plate 27 then contacts with the incline 24. Forward or rearward movement of the incline 24 under the trailer causes the plate 27 to pivot about the point 29 and exert an upward force on the roller 42 which is transmitted to the arm 41. This in turn is transmitted to the bell crank 40, causing it to pivot in a clockwise direction about the brackets 30 and 31 and exert a pushing force on the leaf spring arms 44. This is transmitted through the portion 48 to the arm 47, causing the arm 47 to pivot in a counter-clockwise direction about the pivot point in the bracket 46. This movement is also transmitted through the point of pivotal connection with the arms 49 and exerts a pushing in the rearward direction on the axle 50. As the incline 24 has been pushed under the trailer, the weight of the trailer and its load is supported on the tractor so that the axle 50 has been permitted to drop out of the notches 64 in the brackets 62. The axle 50 then slides along the edge of the track 63 and the force exerted on the member 49 causes the axle 50 to slide in the track 63 in a rearward and upward direction. At that time the axle 53 also slides rearwardly and upwardly in the track 66 in the bracket 65. When in the raised position, the parts occupy the position shown in Fig. 2.

When the tractor is uncoupled from the trailer and moves away from the trailer, the weight of the supporting frame structure is such that it moves forward and downwardly in the brackets 62 and 65 until the wheels 60 and 61 touch some firm support and are held against further movement in this direction. As this occurs the movement is translated back through the linkage and interconnected bell crank to the plate 27 and pushes it into the position shown in Fig. 5, where it is held so long as the axle 50 is held in one of the notches 64 of the bracket 63 by the weight of the trailer and its load exerted on this point.

While I have illustrated and described one embodiment of my invention, it is apparent that various changes and modifications may be made without departing from the spirit of my invention, and I do not wish to be limited to the precise details of construction as herein set forth, but desire to avail myself of all changes within the scope of the appended claims.

Having thus described my invention, what I claim is new and desire to secure by Letters Patent of the United States is:

1. In a trailer, a trailer support including a plurality of connected rigid side members and a plurality of rigid cross members, an axle secured across the lower end of said support, wheels mounted on said axle, brackets secured to the sides of the trailer and having means to receive and hold the ends of certain of said rigid cross members, and means for moving said support as a unit and including an arm operatively connected with one of said rigid cross members, and a flexible link member operatively connected to said arm, and means for moving said flexible link member and said arm including a pivotally mounted depending plate and means adjacent thereto for transmitting movement of said plate to said flexible link member.

2. In a trailer, a trailer support including a plurality of connected rigid side members and a plurality of rigid cross members, an axle secured across the lower end of said support, wheels mounted on said axle, brackets secured to the sides of the trailer and having means to receive and hold the ends of certain of said rigid cross members, and means for moving said support as a unit and including an arm carried by the trailer and operatively connected to one of said rigid cross members, a link member operatively connected to said arm, and means for moving said link member, including a pivotally mounted depending plate and means adjacent thereto for transmitting movement of said plate to said link member.

3. In a trailer, a trailer support including a plurality of connected rigid side members and a plurality of rigid cross members, an axle secured across the lower end of said support, wheels mounted on said axle, brackets secured to the side sills of a trailer vehicle and having means to receive and hold the ends of certain of said rigid cross members, and means for moving said support as a unit and including an arm carried by the trailer and operatively connected with one of said rigid cross members, a flexible link member operatively connected to said arms, a fifth wheel for the trailer, and means adjacent the trailer fifth wheel for moving said flexible link member and including a pivotally mounted depending plate and means adjacent thereto for transmitting movement of said plate to said flexible link member.

4. In a tractor trailer combination, a trailer support including a plurality of connected rigid side members and a plurality of rigid cross members, an axle secured across the lower end of said support, wheels mounted on said axle, brackets secured to the sides of the trailer and having means to receive and hold the ends of certain of said rigid cross members, and means for moving said support as a unit and including an arm operatively connected with one of said rigid cross members, a flexible link member operatively connected to said arm, and means mounted adjacent the trailer fifth wheel for moving said flexible link member, coacting fifth wheel elements fixed to the tractor and trailer respectively, said latter means including a pivotally mounted depending plate adapted to contact with the tractor and be moved thereby during the coupling of the vehicles, and means adjacent said depending plate for transmitting movement of said plate to said flexible link member.

5. In a trailer, a trailer support including a triangular shaped rigid supporting framework including a plurality of connected rigid side members and a plurality of rigid cross members, an axle secured at the lower point of said triangular shaped rigid supporting framework, supporting wheels journaled on said axle, brackets secured to the side sills of a trailer vehicle and having means to receive and hold the ends of the upper of said rigid cross members, and means operatively connected with one of said rigid cross members for moving the entire support as a unit relative to said brackets, and including a pivotally mounted arm operatively connected with one of said rigid cross members, a fifth wheel for said trailer, and means for moving said arm including a pivotally mounted depending plate adjacent the fifth wheel of the trailer and means operatively connecting said plate to said arm whereby movement of said plate is transmitted to said arm.

6. In a trailer, a trailer support including a plurality of connected rigid side members and a plurality of rigid cross members, an axle secured adjacent one of said rigid cross members, wheels mounted on said axle, brackets secured to the sides of the trailer and having means to receive and hold the ends of certain of said rigid cross members, a fifth wheel for the trailer, and means operatively connected with one of said rigid cross members for raising the entire support as a unit relative to said brackets, and including a depending plate pivotally mounted adjacent the trailer fifth wheel, and means operatively connecting said plate to means for transmitting movement of said plate to said support, said means being actuated by the lowering of the support to place said plate in position to be moved to raise said support upon coupling of the trailer to a tractor.

7. In a trailer, a trailer support including a plurality of connected rigid members and a plurality of rigid cross members secured thereto and forming a triangular shaped rigid supporting framework, an axle secured adjacent one of said rigid cross members, wheels mounted on said axle, brackets secured to the sides of the trailer, said brackets having upwardly inclined track portions to receive and hold the ends of certain of said rigid cross members, a fifth wheel for the trailer, and means operatively connected with one of said rigid cross members for moving the entire support as a unit relative to said brackets and including a depending plate pivotally mounted adjacent the trailer fifth wheel, and means operatively connecting said plate to means for transmitting movement of said plate to said support, said means being actuated by the lowering of the support to place said plate in position to be moved to raise said support upon coupling of the trailer to a tractor.

8. In a trailer, a trailer support including a plurality of connected rigid side members and a plurality of rigid cross members, an axle secured across the lower end of said support, wheels mounted on said axle, brackets secured to the sides of the trailer, said brackets each having upwardly inclined track portions adapted to receive and hold the ends of certain of said rigid cross members, one of said brackets on each side of said trailer having a plurality of notches adjacent said track portion, and means operatively connected with one of said rigid cross members for moving the entire support as a unit relative to said brackets, a fifth wheel for the trailer, and including a pivotally mounted arm operatively connected with one of said rigid cross members, and means for moving said arm including a pivotally mounted depending plate adjacent the fifth wheel of the trailer and means operatively connecting said plate to said arm whereby movement of said plate is transmitted to said arm.

9. In a tractor trailer combination including the chassis of the tractor having a trailer elevating portion at its rear end and a coupling means, and the frame of the trailer having a forward end adapted to be engaged on the portion and coupling means cooperating with the coupling means of the tractor; a rigid and wheeled prop mounted at the forward end of the trailer, upwardly and rearwardly inclined guideway elements fixed at the respective sides of the trailer frame, said prop having slidable connection in said guideways, a swinging element mounted at the forward end of the trailer and adapted to engage the rear end of the tractor for swinging the element upwardly, a connection between said element and the prop including a connecting bar between the prop and said latter element, and levers connecting said bar to said element and to said prop, whereby upward movement of the element imparts a rearwardly directed force on the prop for moving it upwardly in the guideways.

SIDNEY B. WINN.